US006640437B2

(12) United States Patent
McFarland

(10) Patent No.: US 6,640,437 B2
(45) Date of Patent: Nov. 4, 2003

(54) METHOD FOR INSTALLING STATOR VANES

(75) Inventor: Christopher C. McFarland, East Hartford, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 10/355,574

(22) Filed: Jan. 31, 2003

(65) Prior Publication Data

US 2003/0140493 A1 Jul. 31, 2003

Related U.S. Application Data

(62) Division of application No. 09/749,319, filed on Dec. 27, 2000.

(51) Int. Cl.[7] ........................................ B23P 15/00

(52) U.S. Cl. ........................ 29/889.22; 29/889.21; 29/889.1; 29/402.03; 29/23.51

(58) Field of Search ........................ 29/888, 23.51, 29/890.031, 889.1, 889.2, 889.21, 889.22, 402.01, 402.03

(56) References Cited

U.S. PATENT DOCUMENTS

| | | | |
|---|---|---|---|
| 3,849,023 | A | 11/1974 | Klompas |
| 4,953,282 | A | 9/1990 | Corsmeier et al. |
| 5,192,492 | A | 3/1993 | Gately et al. |
| 5,263,798 | A | 11/1993 | Dupeuble et al. |
| 5,918,356 | A | 7/1999 | Guerin et al. |
| 6,006,407 | A | 12/1999 | Reverman et al. |

*Primary Examiner*—I Cuda Rosenbaum
(74) *Attorney, Agent, or Firm*—Bachman & LaPointe, P.C.

(57) ABSTRACT

A method for installing stator vanes comprises the steps of installing a first rotor assembly within a case, placing a first inflatable tool over a portion of the first rotor assembly, positioning a first vane array having at least one vane on a surface of the tool, inflating the tool so that a portion of each vane and the first vane array is loaded against the case, and connecting each vane in the first vane array to the case.

7 Claims, 3 Drawing Sheets

METHOD FOR INSTALLING STATOR VANES

CROSS REFERENCE TO RELATED APPLICATION(S)

This application is a divisional application of U.S. patent application Ser. No. 09/749,319, filed Dec. 27, 2000, entitled PNEUMATIC PRESS VANE LIFT INSTALLATION TOOL to Christopher C. McFarland.

BACKGROUND OF THE INVENTION

The present invention relates to a tool for installing stator vanes in a turbine engine and a method of using same.

Turbine engines are typically formed by stacking rotor and stator vane assemblies one on top of another and by attaching the stator vanes to an engine case. Newer engines utilize a one-piece engine case rather than the previous split-case design. This has resulted in a blind operation during the attachment of the stator vanes to the engine case which can impact how well the stator vanes are attached to the engine case. It is important that the stator vanes be held tightly against the case during installation to prevent unwanted vibration during engine operation. Prior tools which have been used to install the stator vanes can not be used with the one-piece engine case. Thus, there is a need for an installation tool which will help insure the proper installation of stator vanes in a one-piece engine case.

SUMMARY OF THE INVENTION

Accordingly, it is an object of the present invention to provide an installation tool which can be used to properly position stator vanes for attachment to an engine case.

It is an object of the present invention to provide an improved method for installing stator vanes in an engine case.

The foregoing object is attained by the method of the present invention.

In accordance with the present invention, a pneumatic press vane lift installation tool is described. The tool is formed by two inflatable, semi-circular tubes which are placed between a rotor assembly and a stator vane assembly during the installation of the stator vane assembly. The tubes are each positioned adjacent an inner end of the stator vanes in the vane assembly and are inflated to apply a lifting force to the vanes. While being supported in this manner, the vanes are attached to the engine case.

The method for installing stator vanes in accordance with the present invention broadly comprises installing a first rotor assembly within a case, placing a first inflatable tool over a portion of the first rotor assembly, positioning a first vane array having at least one vane on a surface of the tool; inflating the tool so that a portion of each vane in the first vane array is loaded against the case, and connecting each vane in the first vane array to the case.

Other details of the installation tool and the method of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
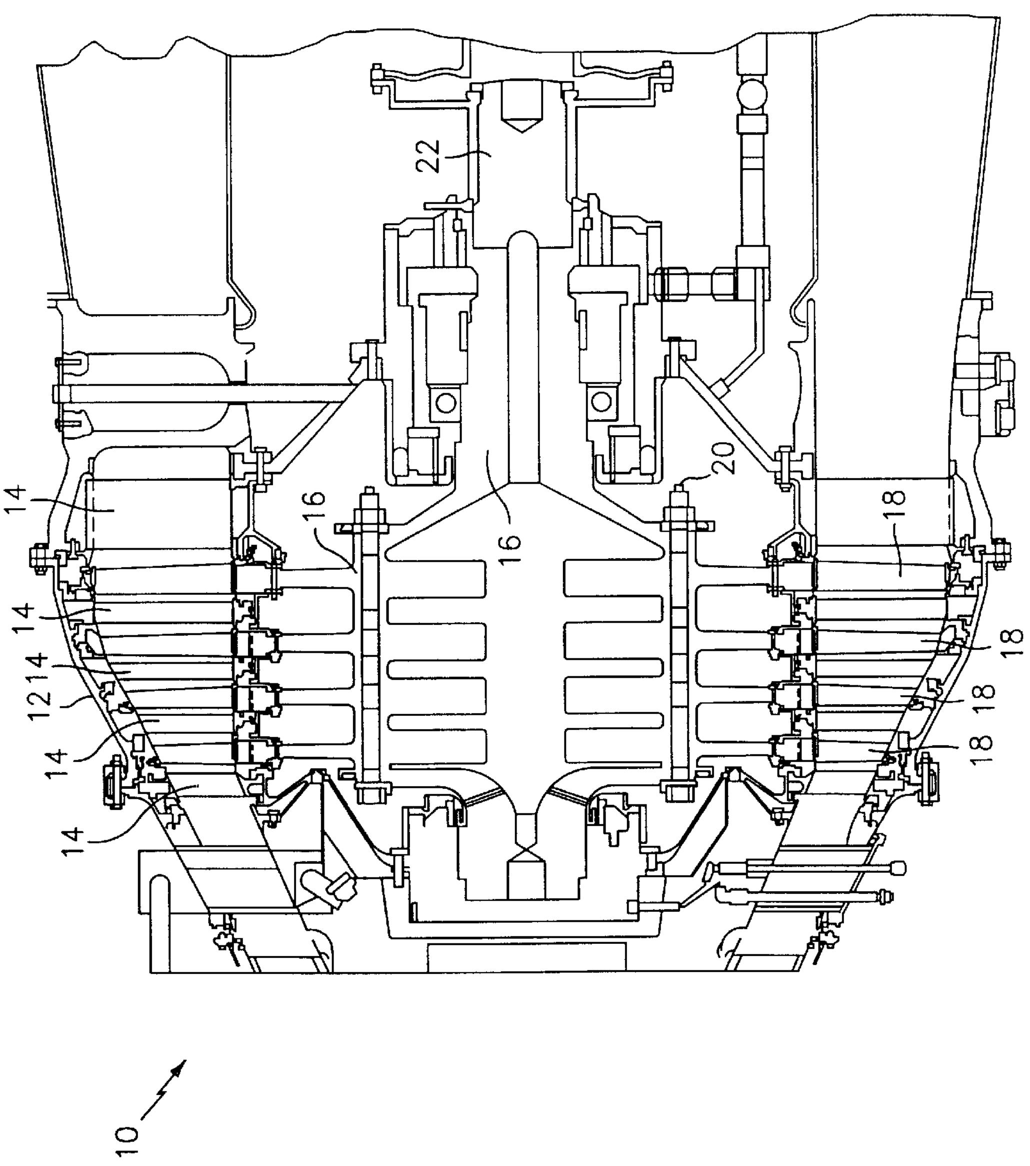
FIG. 1 is a sectional view of a portion of a turbine engine.

Referring now to the drawings, FIG. 1 illustrates a portion of a turbine engine 10. The engine 10 has a one-piece outer case 12. Mounted to the engine case 12 are a plurality of stator vanes 14. The engine 10 further has a rotor assembly 16 formed by a plurality of layers of rotors 18. The rotor layers are joined together by pin and bolt assemblies 20 which are also used to join the rotor assembly 16 to an output shaft 22.

The stator vanes 14 are cantilevered structures which are held against the case 12 by a groove and bracket mount assembly. It is important for proper assembly of the engine 10 that the stator vanes 14 be held tight against the case 12 during their installation so as to prevent unwanted vibrations during engine operation. A pneumatic press lift tool is needed to assure proper installation of the stator vanes 14.

Figure 2:
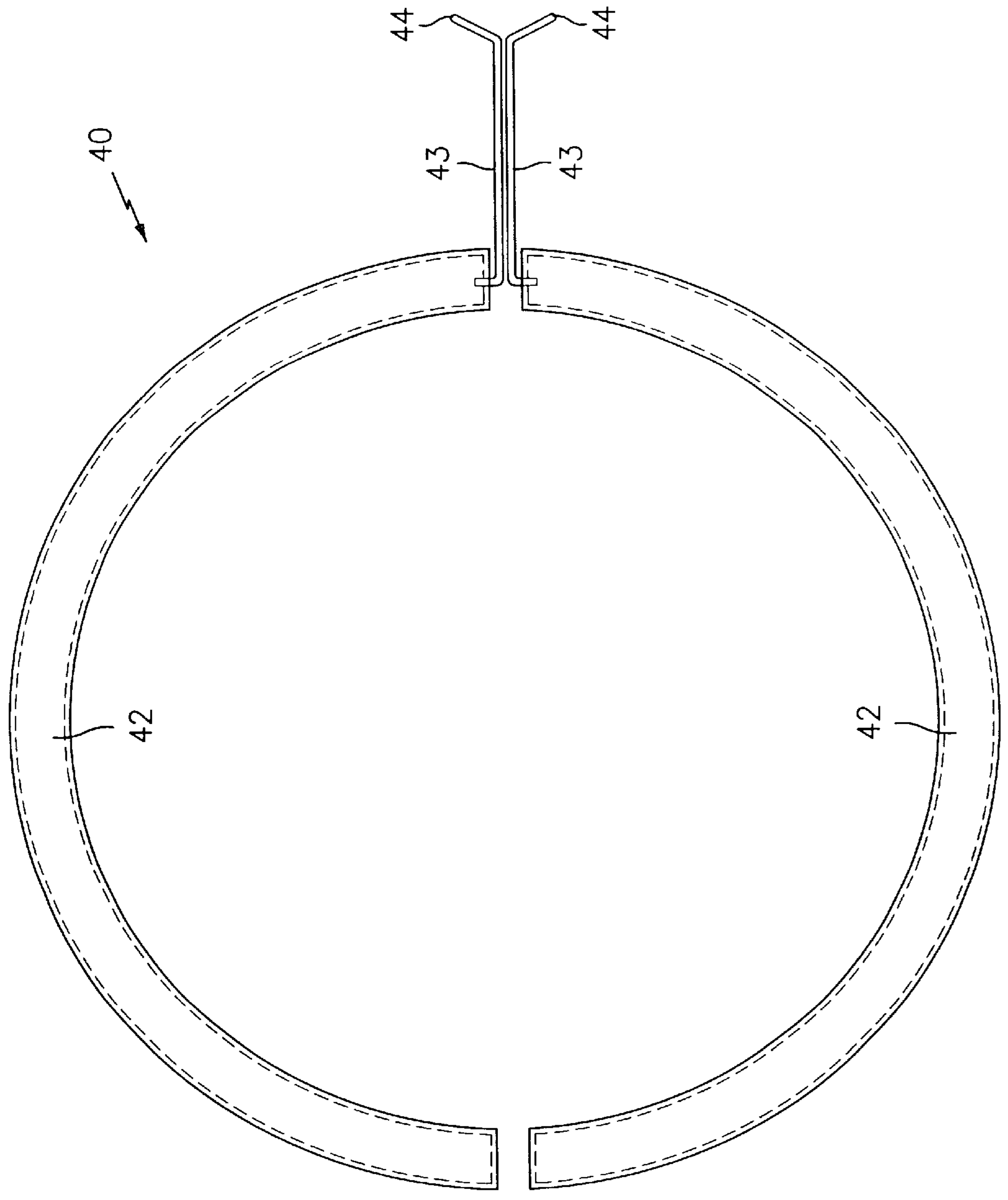
FIG. 2 is a top view of an installation tool in accordance with the present invention.

Referring now to FIG. 2, a tool 40 for assuring proper installation of the vanes 14 is illustrated. The tool 40 is formed by two inflatable tubes or bladders 42 each formed from a flexible plastic material, such as nylon, or a rubber material. Each inflatable tube 42 is sized to fit between a rotor assembly and an adjacent vane array to be installed. Further, each inflatable tube 42 has a substantially semi-circular configuration to allow it to be properly positioned within the engine case 12 during installation. Each inflatable tube 42 has a stem 43 with an air valve 44 at its tip. The stem 43 and the air valve 44 allow a respective tube 42 to be connected to a source (not shown) of an inflating fluid. The valve 44 also allow the respective tube 42 to be easily deflated after installation of the stator vanes 14 has been completed.

Figure 3:
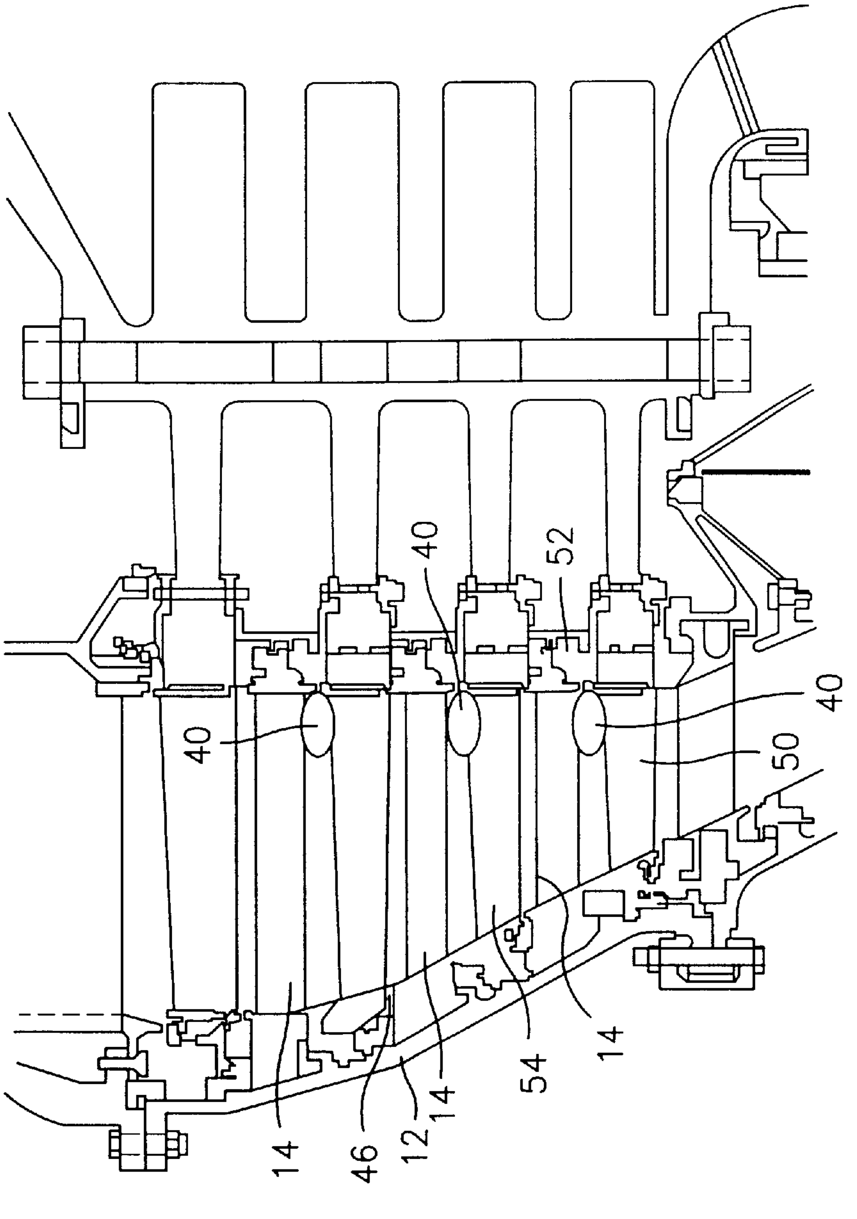
FIG. 3 is a sectional view illustrating the method of assembling an engine in accordance with the present invention.

Referring now to FIG. 3, an engine is fabricated by first orienting the case 12 nose down. Thereafter, a first layer 50 of rotors is installed within the case 12. An inflatable installation tool 40 comprising two inflatable tubes 42 is positioned over a surface of the rotor layer 50 while the tubes 42 are in a deflated state. The tool 40 is positioned on the rotor layer 50 so that each tube 42 will be adjacent an inner edge 52 of an array of stator vanes 14 to be installed. Following placement of the tool 40, a first array of stator vanes 14 is positioned within the case 12. The array of stator vanes typically is an annular array of a plurality of stator vanes. After the array of stator vanes has been positioned in the case 10, a second rotor layer 54 is positioned over the first stator vane array. The tubes 42 are then each inflated to lift the inner edges of the vanes 14 in the first stator vane array and load the forward foot 46 of each vane 20 against the case 12. Each stator vane 14 is then connected to the case 12 using any suitable connection system (not shown) known in the art. Following the installation of the stator vanes 20 in the first array, the rotor layers and vane arrays are stacked as previously discussed with one or more of the tools 40 being positioned between a surface of each rotor layer and an adjacent surface of each vane in an adjacent vane array.

After all of the stator vanes 14 have been installed, the tools 40 have their respective tubes 42 deflated. Once the tubes 42 have been deflated, they can be easily removed from between each rotor layer and an adjacent vane array.

In accordance with the method of the present invention, the inflatable tubes 42 may be inflated sequentially or concurrently. One of the primary advantages to the tool 40 is its simplicity. Other tools used to assemble turbine engines use many hooks to grab the vanes being installed. The result is that the vanes are lifted into place in a cumbersome, expensive and time consuming manner. The tool of the present invention also has the advantage that it provides more freedom for vane/case designers so that hardware is assemblable. The tool also resolves the assembly of single piece case stacking. The tool can be used both in engine assembly and in engine overhaul.

It is apparent that there has been provided in accordance with the present invention a pneumatic press vane lift installation tool which fully satisfies the means, objects, and advantages set forth hereinbefore. While the present invention has been described in the context of specific embodiments thereof, other alternatives, variations, and modifications will become apparent to those skilled in the art having read the foregoing description. Therefore, it is intended to embrace those alternatives, modifications, and variations which fall within the broad scope of the appended claims.

What is claimed is:

1. A method for assembling an engine comprising:

installing a first rotor assembly within an engine case;

placing a first inflatable tool over a portion of said first rotor assembly;

placing a first vane array having at least one vane on a surface of said inflatable tool;

inflating said inflatable tool so that a portion of each vane in said first vane array is loaded against said engine case; and connecting each said vane in said first vane array to said engine case while said tool is in said inflated condition.

2. A method according to claim 1, further comprising orienting said engine case in a nose down condition prior to installing said first rotor assembly.

3. A method according to claim 1, wherein said inflatable tool placing step comprises placing two substantially semi-circular tubes over at least a portion of said first rotor assembly.

4. A method according to claim 1, wherein said inflatable tool placing step comprises placing said inflatable tool adjacent an inner end of each said vane in said first vane array.

5. A method according to claim 1, further comprising:

positioning a second rotor assembly over said first vane array;

placing a second inflatable tool over a portion of said second rotor assembly; and positioning a second vane array having at least one vane over said second inflatable tool.

6. A method according to claim 5, further comprising:

inflating said second tool to lift each said vane in said second vane array; and attaching each said vane in said second vane array to said engine case.

7. A method according to claim 6, further comprising deflating each said inflatable tool after said vanes in said vane arrays have been attached to said engine case.

* * * * *